US006873966B2

(12) United States Patent
Babbitt et al.

(10) Patent No.: US 6,873,966 B2
(45) Date of Patent: Mar. 29, 2005

(54) DISTRIBUTED NETWORK VOTING SYSTEM

(75) Inventors: Victor L. Babbitt, Berthoud, CO (US); Neil L. McClure, Louisville, CO (US)

(73) Assignee: Hart InterCivic, Inc., Austin, TX (US)

(*) Notice: Subject to any disclaimer, the term of this patent is extended or adjusted under 35 U.S.C. 154(b) by 246 days.

(21) Appl. No.: 09/882,758

(22) Filed: Jun. 15, 2001

(65) Prior Publication Data

US 2002/0019767 A1 Feb. 14, 2002

Related U.S. Application Data

(60) Provisional application No. 60/211,840, filed on Jun. 15, 2000, and provisional application No. 60/255,486, filed on Dec. 13, 2000.

(51) Int. Cl.[7] ............................ H04L 9/30; G06F 17/60

(52) U.S. Cl. ......................... 705/12; 235/51; 235/51 R; 235/51 B; 235/57; 705/50

(58) Field of Search ..................... 705/12, 50; 713/155, 713/180; 235/386; 380/30

(56) References Cited

U.S. PATENT DOCUMENTS 5,764,221 A * 6/1998 Willard ...................... 345/173
6,081,793 A * 6/2000 Challener et al. ............. 705/50
6,250,548 B1 * 6/2001 McClure et al. .............. 235/51

OTHER PUBLICATIONS

SARC—Computer Viruses: An Executive Brief, 1998 SYMANTEC Corporation, Pages 9–12.*

* cited by examiner

*Primary Examiner*—James P. Trammell
*Assistant Examiner*—Daniel L. Greene
(74) *Attorney, Agent, or Firm*—Lathrop & Gage, L.C.

(57) ABSTRACT

A secure election system provides a downloadable ballot viewer object for the casting of ballots. The ballot viewer object authenticates the user, permits user interaction in the casting of ballots, seals the cast ballot image by encryption, and transmits the cast ballot to election headquarters. The ballot viewer object may be used to perform secure voting on the Internet.

75 Claims, 6 Drawing Sheets

DISTRIBUTED NETWORK VOTING SYSTEM

RELATED APPLICATIONS

This application claims benefit of priority to provisional application Ser. No. 60/211,840 filed Jun. 15, 2000, and provisional application Ser. No. 60/255,486 filed Dec. 13, 2000.

BACKGROUND OF THE INVENTION

1. Field of the Invention

The present invention relates to electronic voting systems and, more specifically, to networked interactive online devices and methods for facilitating elections through the use of computer network systems. Examples of elections that may make use of these systems include local, state, and national elections, as well as any other voting decision, such as a corporate election of a board of directors or decisions being made by a local homeowner's association.

2. Statement of the Problem

Elections are a fundamental process by which governments decide who will govern, whether the general public will accept new legislation, whether constitutions will be amended, and other matters of high importance. Voters formerly wrote down their choices on a ballot and anonymously cast the ballot in a ballot box. The ballot was later retrieved and counted along with other cast ballots. This process embodied numerous problems. The process of counting votes to decide ballot issues was time consuming. In close elections, uncertainty over the correctness of the counts often required time-consuming recounts in close elections. A single voter could sometimes cast numerous ballots because there was no comprehensive system to check for voter eligibility.

Election procedures have substantially changed in modern times. Modern elections are performed on a large scale with the aid of computerized systems. For example, U.S. Pat. No. 5,758,325 to Lohry et al. and U.S. Pat. No. 5,278,753 to Graft et al. show distributed hierarchical systems including a headquarters unit that oversees or governs the operations of multiple precinct units. In turn, the precinct units oversee or govern the operations of numerous voting booths. In both systems, data is transported between the headquarters unit and the precinct unit using a nonvolatile memory cartridge. This memory cartridge may include a CD ROM, EPROM, or other form of nonvolatile memory. Thus, communications that are transmitted by electronic signals between the precinct unit and the headquarters unit may later be confirmed after the precinct election data is delivered by hand to the headquarters. Security algorithms at headquarters verify that the nonvolatile memory module is authentic. This system prevents election tampering by the intercept of electronic signals.

A significant problem affecting democratic elections is low voter turnout. Many potential voters do not bother to register and, consequently, cannot vote. Other voters who are registered do not take the time to vote. This problem is related to the difficulty of voting because voters must often occupy several hours to travel to a precinct voting station, wait in line and vote. This problem occurs even when computerized voting systems are used.

One solution to low voter turnout is to provide easier access enabling more voters to participate in elections. This could be done using extant computer networks, e.g., the Internet, with appropriate security precautions in place. Nevertheless, use of non-dedicated or general-purpose computer networks has heretofore been impracticable because these networks are insecure. For example, a skilled programmer could assemble a computer virus that would disrupt a national election either by causing the system to crash or by transmitting false results. Trojan horse programs can be created appearing to provide some useful service, but actually executing unexpected and unwanted functions, and these programs can be distributed to reside on many hard drives. Absent authentication of ballot information, a possibility also exists that election fraud might be perpetrated by the use of software to generate ballots favoring one candidate over another.

There remains a need to provide a secure voting system that can be accessed over a network and, particularly, a general purpose or non-dedicated computer network.

OBJECTS OF THE INVENTION

Accordingly, an object of the present invention is to provide a secure balloting system that makes use of distributed network technology, such as the Internet, in the process of holding elections.

Another object is to provide a network-downloadable ballot viewer object having components that improve voter participation and turnout through ease of use in the election process.

Yet another object is to provide alternative method and apparatus for the casting of absentee ballots.

Additional ballot viewer objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

Solution

To achieve the foregoing objects, and in accordance with the purposes of the invention as embodied and broadly described in this document, method and apparatus are provided that use a computer readable form to facilitate the casting of ballots in a secure way on network systems, e.g., the Internet.

In accordance with one aspect of the invention, the computer readable form embodies machine executable instructions for permitting voters to cast ballots in an election. The computer readable form embodies machine executable instructions for permitting a voter to cast a ballot by interaction with an official ballot image resulting in the creation of a cast vote record. The computer readable form is preferably packaged as a ballot viewer object that optionally includes, in combination with the executable instructions, data that cooperates with the executable instructions to authenticate the voter, display the official ballot image to the voter, permit the voter to create a cast vote record by interaction with the displayed ballot image until such time as the voter cast the ballot to produce a cast vote record, and transmits the ballot to as server. The computer readable form, in combination with the data for the executable code, may be uniquely created for each voter. Downloadable components of the ballot viewer object may include, for example, executable code, data, new virus definitions, voter authentication data, and ballot image data. The ballot viewer object may be downloaded as an email attachment or a downloadable file that is stored on a server.

The computer readable form may contain program instructions for authenticating the voter by comparing official voter authentication data against data that is input by the voter. Authentication may also be performed by comparing an official password against a password that is provided by the voter, by accessing a biometric authentication device such as a fingerprint analyzer. Alternative authentication instructions include those that access a device that is known to be in the possession of the voter, where the device may be selected from the group consisting of a smart card, an optical storage device, and a magnetic storage device. The voter identification information may be hashed, i.e., processed by a conventional hashing algorithm, and compared against voter input data that has been hashed by an identical algorithm.

The computer readable form may contain an official ballot image that presents the voter with all choices as they would appear on an absentee paper ballot that the voter would receive in an election. The contests resented to the voter are preferably only those in which the voter is eligible to vote.

Virus protection instructions of the computer readable form may optionally include instructions for checking video memory that is in association with a driver for a computer display against data for ballot selections that the voter has made. Thus, for example, in an election having two contestants A and B, the voter's selection choice for either candidate may be indicated by a 0 or a 1 in a corresponding byte that is allocated to the contest or a plurality of bytes allocated to each candidate. The corresponding video memory should show a corresponding mark allocated to the voter's choice, and a lack of such a mark in an indicator of corruption. Additional virus protection measures that are implemented by the program instructions may be selected from the group consisting of compiled sections of executable code with a plurality of static functions in different order, the insertion of junk functions into executable code, an absence of text tags to system function calls, serialized executable file names, serialized data file headers, virus checking upon execution of the computer readable form for viruses that are known to interact with the computer readable form, and means for comparing video memory to the ballot image that is displayed to the voter.

The program instruction may optionally but preferably include an encryption algorithm that is used to encrypt the cast vote record and/or the ballot viewer object prior to transmission. Preferred encryption algorithms are those that use public and private key encryption. The program instructions may include code for accessing a secure transmission protocol in transmitting the cast vote record to an election server.

The ballot viewer object preferably deletes itself upon transmission of the cast vote record.

In accordance with other aspects of the invention, a method and system are provided for use in voting through network telecommunications through use of the downloadable ballot viewer object that has been described above. The method and system use a combination of software and hardware that functions to download the ballot viewer object to the voter, authenticate the voter in association with the ballot viewer object, display to the voter an official ballot image derived from the ballot viewer object, create a cast vote record by voter interaction with the official ballot image, and transmit the cast vote record to an election server.

The method and system may download the ballot viewer object, for example, as an email attachment, or the ballot viewer object may be stored on a server that is accessible from the Internet. In the latter case the method and system may generate an email to notify a voter that the downloadable ballot viewer object has been stored on the server and is available for download, and password confirmation may be required prior to commencing the downloading step A transactional fee may be charged for at least one of the downloading and transmitting functions, especially where these functions are performed using an official service of the United States Postal Service, such as the POSTeCS system.

The downloading and transmitting functions are optionally but preferably performed using a secure transmission protocol, such as SSL.

The method and system may utilize program instructions for encrypting the ballot viewer object or cast vote record prior to transmission. The program instructions also preferably authenticate the voter by comparing the voter authentication information with interactive data input that is provided by the voter. As described above in the context of the ballot viewer object, the voter authentication information contained in the ballot viewer object may be hashed, and authentication may include hashing the interactive input from the voter for comparison purposes. The ballot image display preferably includes an electronic replica of an absentee paper ballot that a voter would receive in an election, and the program instructions may delete the ballot viewer object and cast vote record from a voter's computer once the transmitting step is complete.

The method and system may include program instructions for sending an email confirmation message to the voter upon receipt of the cast vote record that is transmitted by the voter, and this confirmation message may include a replication of the voter's cast vote record.

The combination of voter authorization information and official ballot image information that is assigned to a particular voter is normally unique for that voter. For example, the official ballot image information may consist of selected contests in which the voter is authorized to vote. As mentioned above, method and system may use an official server that is authorized or operated by the United States Postal Service. Where the postal server is used, or in more general terms, an official postal server that authorized by a national government agency for the transmission of electronic data, an aspect of the invention comprises an improvement to existing systems in the form of an interface for batch control processing of electronic ballot information as directed by an election server. Alternatively, the Internet or direct-dial networking may be availed without necessarily resorting to an official postal server.

Specialized problem resolution procedures may be implemented to overcome a variety of problems that result form the use of network data transmissions, such as procedures to parse the cast vote record to identify corrupted ballot information, preventing a single voter from casting multiple ballots, notifying the voter that an ballot viewer object has been downloaded but the transmitting step has not been completed within a predetermined amount of time since the downloading step occurred, facilitating a subsequent download in the event of a download failure upon an initial attempt at performing the download step, and protection against virus attack. Virus remediation procedures include such measures as compiling sections of executable code with a plurality of static functions in different order, inserting junk functions into executable code, avoiding use of text tags to system function calls, using serialized executable file names, using serialized data file headers, checking upon execution of the computer readable form for viruses that are known to interact with the computer readable form, and comparing video memory to selection choice data for the ballot image that is displayed to the voter to confirm accuracy of the ballot image.

BRIEF DESCRIPTION OF THE DRAWINGS

The accompanying drawings, which are incorporated in and constitute a part of the specification, illustrate a presently preferred embodiments and methods of the invention and, together with the general description given above and the detailed description of the preferred embodiments and methods given below, serve to explain the principles of the invention.

DETAILED DESCRIPTION OF THE PREFERRED EMBODIMENTS AND METHODS

Figure 1:
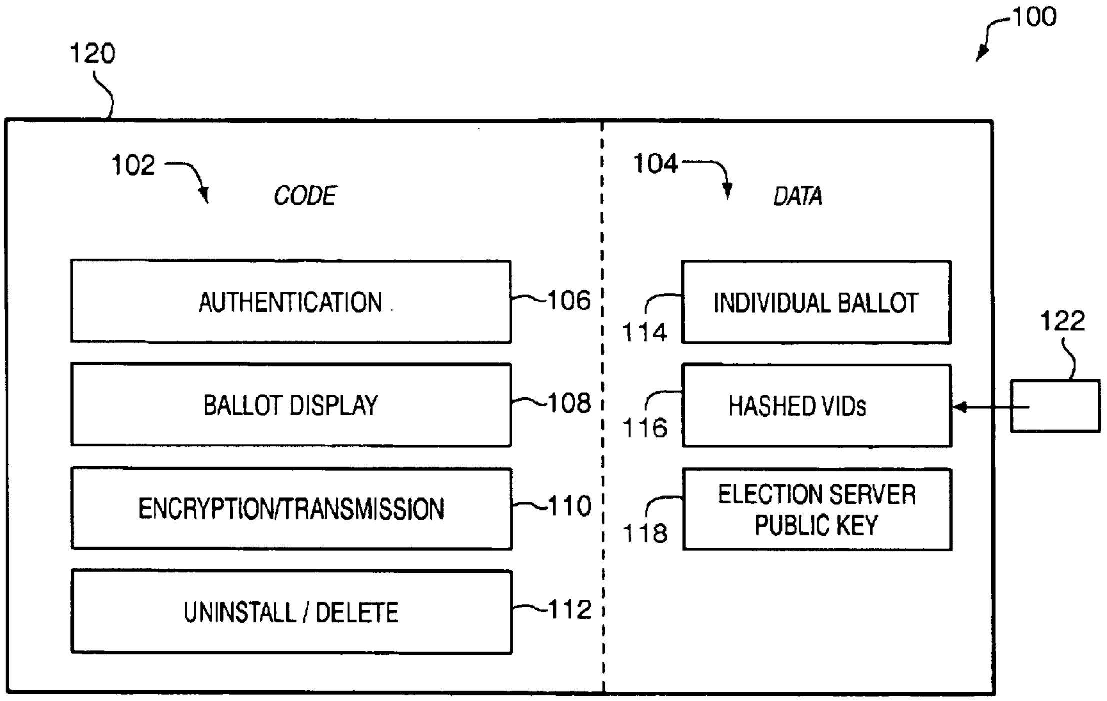
FIG. 1 is a schematic block diagram showing a preferred embodiment of a downloadable ballot viewer object for use according to the general principles described herein.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

In accordance with one aspect of the invention, a computer readable form is provided that embodies machine instructions for permitting voters to cast votes. In this sense, the computer readable form may comprise any file that can be read by a computer including, for example, a file that resides on magnetic data storage media, optical data storage media, or a file that resides on paper and may interpreted by optical character recognition or by a bar-code scanner.

The computer readable form is a ballot viewer object including program instructions for use in processing data that may optionally be packaged with the computer readable form. The ballot viewer object preferably exists as a downloadable file, such as an email attachment, a file that is stored on a server, or a file (such as an applet) that may be downloaded in the consequence of interacting with an Internet Web page.

It is particularly preferred that the ballot viewer object is completely self-sustaining in the sense that it does not require continuing interaction with a server once a voter has received data, if needed, on which the executable code will operate and executed the executable code to commence voter authentication and the selection of ballot choices. The preference for a self-sustaining object does not preclude downloading of the ballot viewer object from a server, nor does it preclude the transmission of a sealed cast vote through a server.

The ballot viewer object uses executable code to authenticate a voter in association with authentication data that may optionally be provided as part of the ballot viewer object, code for displaying a official ballot image data to the voter, code for permitting a voter to enter votes by interaction with the ballot image that is displayed by the displaying means, and code for transmitting the resultant cast vote record to the election headquarters server. The executable code may be contained in the ballot viewer object itself or provided to the voter on a data storage medium, e.g., a CD-ROM or magnetic disk.

FIG. 1 depicts, by way of example, a ballot viewer object or computer readable form 100 including both machine-readable code 102 and data 104 for use in conjunction with the machine-readable code 102. The machine-readable code 102 and data 104 may be packaged as an email message with executable attachment that permit a voter to cast a vote in an election. The ballot viewer object 100 may be sent to the voter as an email attachment. The machine-readable code 102, by way of example, preferably includes program instruction modules for voter authentication 106, ballot image display 108, ballot encryption/transmission 110, and uninstall/delete 112 functions. The data 104 includes an individual ballot 114, security measures such as hashed voter identification data (VID data) 116, and election server public key 118. These elements and their functions are explained below in additional detail. It is worth noting at the present time, however, that the ballot viewer object 100 may itself comprise other ballot viewer objects, such as an imaging ballot viewer object formed as the combination of the ballot display module 110 and the individual ballot 114. The ballot viewer object 100 may also comprise a plurality of separate program files and data files that are not necessarily transmitted in a single package, i.e., the line 120 surrounding these elements is a logical and not a physical line.

The ballot viewer object 100 provides familiarity and comfort to voters and election officials through use of an electronic ballot having similar characteristics with respect to the characteristics of a paper absentee ballot. Ballot viewer object 100 is transmitted to the voter, for example, as either an email attachment or as a downloaded file that is accessed as an Internet web page form. Once ballot viewer object 100 resides on the voter's computer and is executed, the voter is able to vote by being authenticated and presented with an interactive ballot image. The voter enters his selection and casts the votes and "seal" the ballot to protect against further modification of the cast vote record. The voter's act of casting votes preferably causes the executable code 102 to seal the ballot by encrypting the voter's cast ballot. The sealed ballot including the cast vote record is transmitted to the election server, and the ballot viewer object 100 then deletes itself, leaving little or no trace. This process is very similar to voting by a paper absentee ballot, which is opened, voted on and sealed up in an envelope and returned. Voters and election officials who are mistrustful of network voting systems find familiarity and comfort with this system due to the aforementioned analogies to absentee voting through paper ballots.

The authentication module 106 prompts the user for data input and compares this input to hashed VID data 116. The VID data 116 might comprise, for example, Social Security numbers, Date of Birth, Zip Code, a Personal Identification Number (PIN) issued by the Election Authority, or the voter's personal password sent to an election authority by the voter via postal mail. If the voter's computer system has a smart-card interface, a smart card 122 may be used to store a voter's private decryption key, such that the election server would encrypt the VID 116 data using the voter's public key 118. The private key could also potentially be stored on a floppy disk or similar storage medium. It is possible that some sensitive data, such as the user's personal password, might be input by the user, not used for authentication on the voter's system, and used in a second layer of authentication at the election server. Ballot viewer object 100 preferably executes the ballot display module 108 once the voter authentication is complete.

The ballot display module 108 preferably displays a ballot image in the same way that a paper absentee ballot would be displayed, with appropriate minor modifications, such as paging, to accommodate voter interactivity and the presentation of ballot choices to the voter. The ballot display module 108 converts the individual ballot data 114 into a form that can be displayed to the voter using a computer. The ballot display module 108 interactively allows the user to make his or her vote selections, and change selections prior to casting or sealing the ballot.

The ballot display module 110 preferably supports all regular types of ballot logic, the placing of write-in candidates, multiple languages and any other requirements for a particular jurisdiction, all according to data provided in the individual ballot module 114. The ballot display module 108 supports all types of conventional election logic, e.g., vote for one candidate in a particular contest, N of M voting, exact N of M voting, dependent races, etc . . . , where N is the minimum or exact number selections that may be made in a race containing M candidates, e.g., a race with instructions to choose exactly 2 out of 5 choices for this race. A commercially available display system, e.g., the well known Adobe PDF (portable document format), may be used to present the ballot information, or individual screens may be programmed using any language, such as Basic, Fortran, or Cobol, with object-oriented languages such as C++, XML, or Java being preferred.

The voter interacts with the ballot in a conventional manner for casting electronic votes, for example, according to voting processes that exist in commercially available election systems from Hart Intercivic of Austin, Texas. When the voter has completed interaction with the ballot image by marking or selecting the votes being cast, the voter may select an option to cast the ballot and, consequently, seal the ballot image. At this point processing of the ballot image transfers to the encryption/transmission module 110.

The first step in "sealing " the ballot is to encrypt the cast ballot using the election server public key 118. If a smart card interface is available on the voter's system for smart card 122, it is also possible to digitally sign the ballot using the voter's private key. Once encryption/digital signing is complete, ballot viewer object 100 transmits the cast vote record directly over the Internet. The preferred transmission process is to use a secure connection, such as an SSL connection. Ballot viewer object 100 establishes an Internet connection for this transmission if one is not already active. Alternatively, the ballot viewer object 100 transmits the encrypted ballot image as an email attachment using any conventional email package. The encryption/transmission module 110 may contain code for the transmission of the ballot image as an email attachment or regular email.

Once the cast ballot has been transmitted, ballot viewer object 100 preferably deletes itself to leave no trace on the voter's host computer. Complete deletion in the case of Windows[1] operating systems may require a stub uninstall program to be left on the machine in an unobtrusive place until the next reboot.

[1] Windows is Trademark of Microsoft Corporation Located Redmond Wash.

The individual ballot 114 may be any type of information that is readable by the ballot display module 108. According to conventional practices for creating electronic ballots, generally, the ballots are created at an election headquarters using a separate software program that automatically assembles the election data into the various ballot styles that are required for the multiplicity of voter eligibility in an election.

According to the aspect of the invention embodied by ballot viewer object 100, these ballot styles are preferably saved as a single file and transferred to a program on the election server that sends individual ballot viewer objects, such as ballot viewer object 100, as ballot-mail to individual voters. The election headquarters program has a record of each voter who has requested a ballot. The election headquarters program then merges each voter's information with their ballot style to create an executable ballot viewer object 100 that is specific to each voter according to voter authentication and eligibility to vote in specific elections. For example, in a statewide election, a voter who resides in a particular city may be asked to vote on local municipal bond issues, whereas other voters who do not reside in that city are not entitled to vote on those bond issues. Thus, the voter preferably receives a ballot that displays only those contests for which the voter is eligible to vote. Election jurisdictions normally track this information according to conventional voting practices.

The hashed VID information 116 is hashed to make it neither visible nor obtainable directly by anyone who is illicitly viewing the data. The voter repeats entry of this data as part of the authorization module 106, and the entered data is hashed and compared to the stored hashes of the voter identification information 116. Alternatively, if a smart-card 122 is available, the voter identification information 116 can be encrypted using the voter's public key, and then decrypted at the user's computer for authentication.

In still other implementations, a CD-ROM or floppy disk that is physically mailed to the voter can replace the smart card 122. The disk may contain ballot viewer object 100, as well as authentication information in the form of hashed VID's or any other form, together with encryption key information.

The election server public key 118 is optionally and preferably used to encrypt the ballot or cast vote record prior to transmission. Any conventional data encryption algorithm may be used.

As indicated above, a portion of the executable code 102 that comprises ballot viewer object 100 functions as a ballot viewer in the form of an interactive display of ballot information to the voter. The code is optionally but preferably capable of executing on different operating systems, such as those that are commonly employed on Windows, Macintosh, Unix, Linux or other commercially available operating systems. The code is optionally but preferably configured, as needed, to be capable of interacting with technologies that franchise disabled voters, such as speech recognition software, text to audio conversion software, head switches, breath switches, and toggle switches. The code is also capable of implementing voter logic, such as the prevention of multiple selections in a contest where only a single vote may be cast. The code is preferably fault tolerant in the sense that a crash or other fault of the voter's computer during the voting process does not leave ballot viewer object 100 in an undetermined state or allow the transmission of an incorrect or corrupted ballot. Once the voter has cast a ballot, the code optionally but preferably encrypts at least the ballot data prior to transmission. The code also deletes itself upon transmission of the cast ballot to eliminate all traces of ballot viewer object 100 and the cast vote record from the voter's computer after voting.

One of the most serious problems that could occur in the use of ballot viewer object 100 is that the voter's computer could become infected with a virus or Trojan horse. This virus might, for example, detect ballot viewer object 100 on the voter's computer, and insert code that compromises the integrity of election results. This virus could also detect the execution of code within ballot viewer object 100, terminate the execution, and open the virus's own "spoof" program—a program that interacts with the voter in the same manner as ballot viewer object 100 but provides its own cast vote record regardless of the voter input. In this way, the voter could be tricked into casting votes that do not correspond to election choices made by the voter. Certain precautions can mitigate or eliminate this threat.

For a virus to detect an executable ballot viewer object 100, and then insert a malicious code to subvert the voter's intentions, the virus-writing programmer must do two things. He or she must be able to detect the executable itself, and he or she must be able to replace specific functions in the executable or replace specific function calls by inserting false addresses into a function call table. Just randomly inserting code into any executable almost always results in a damaged and non-functional executable. The idea of non-similar binaries is intended to make the latter task more difficult for virus-writing programmers.

In order to write a virus that inserts code into a specific place in the executable code of ballot viewer object 100, the virus writer must know exactly where to place the insertion. If each ballot viewer object 100 executable in a plurality of ballot viewer objects 100 is subtly different, then a virus that was written with one ballot viewer object 100 example in mind will most likely fail in another non-similar executable. Thus, each section of executable code 102 is preferably compiled with various static functions being in different order. In addition, during the compilation of each such executable, various "junk functions" are compiled into the executable, i.e., functions that do not have active uses during voting, but are there simply to confuse any resident viruses. In this way, a virus will not be able to insert code to replace specific functions or function calls, but can only insert in a random fashion, which will almost certainly not create an executable subverted code. Every different voter could receive a different executable if the system that generates the executable code assigns a unique identifier to function calls in the code, or a plurality of different executables could be randomly distributed for use in an election.

It should also be noted that all text tags to functions, as generally exist within Windows .dll (dynamic link libraries) should not exist in the executable code of ballot viewer object 100.

As indicated by the discussion above, the first thing a virus must do is identify the executable. A virus might use several techniques to identify an executable. Additional precautions may be taken to serialize the executables such that these identification points change with each download. Unique file names can be serialized such that each file in the executable code 102 of ballot viewer object 100 has a unique name. This name should be fairly unique, so that viruses cannot search using a simple ****.exe template or similar technique. Similarly, the file sizes can be altered so that the file sizes of each executable does not retain the exact same number of bytes. Data file headers can be serialized in similar fashion.

Notifying voters that their ballot has been cast and replicating the votes that the voter has cast within such notification may mitigate virus "spoofing". Voter's can be emailed that their ballot has been properly cast. The election authority sends out this notification once the ballot has been properly received. Furthermore, if the election headquarters has not received a voter's ballot by a certain day, the headquarters can email the voter and remind him to vote. If voter thinks (because of virus "spoofing") that he has already voted, this could lead to fixing his problem. An election web site can be created to show any voter whether they have properly cast their ballot, and the ballot has been properly received.

As ballot viewer object 100 is executed, the first process it optionally but preferably implements is to connect with the election headquarters server and download the latest definitions for potential election viruses. A scan of the voter's machine is then done using these latest virus definitions prior to the voter being allowed to cast his ballot.

A virus could potentially imitate the user's ballot image and collect the user s authentication information, which it would later use to allow the virus to vote as it has been programmed to vote. When the virus actually casts the corrupted ballot, it is not likely to display the corrupted ballot selections on the screen, as this would be an obvious clue to the voter that something was amiss. Therefore, ballot viewer object 100 preferably but optionally takes snapshots of portions of video memory and compares the information thus obtained to what should be displayed on the user's computer to confirm that the ballot is actually being displayed to the user, instead of being hijacked by a virus. The voter is presented with a virus corruption error if the ballot selection data does not match.

The ballot viewer object 100 may be provided to the voter on a CD-ROM at the time of voter registration, or the voter may download the ballot viewer object 100 from a server. In cases where a CD-ROM is provided to the voter, the CD-ROM may provide a more robust range of related functionalities that are not limited by the excessive download times that would be required to download the associated code in instances where the ballot is posted on a server for eventual download. In either case, additional functionalities may include help functions, such as video help or on-CD html help, and a virus protection engine. The virus protection engine includes the actual program that will check for viruses, but an up-to-date virus definition file is preferably downloaded at the time when voting actually occurs. The CD-ROM is also a mechanism for transmitting a secure PKI private key for encryption purposes, whereas transmission of the key is otherwise insecure and problematic.

Where the voter has received a CD-ROM that contains the executable code 102, the ballot viewer object 100 that is downloaded prior to actual voting may consist of the ballot image data 104 and/or new virus definitions. The voter's download is advantageously smaller. Additionally, the problem is avoided of having the voter pick the proper download for a particular operating system because multiple operating system CD's can be created.

As indicated above, the CD-ROM may be advantageously provided with a private key for encryption purposes. PKI is a preferred solution to voter encryption and authentication, but it relies upon the secrecy of the voter's private key. A virus or Trojan horse may steal a private key that resides on the voter's computer. While in possession of this key, the virus or Trojan horse can digitally sign the ballot on behalf of the voter and decrypt any messages to the voter that were encrypted using the voter's public key.

A solution to this problem, according to some embodiments, is to implement a "ball and chain " concept. According to this concept, a very large random number is generated to include a large amount of data, e.g., perhaps 100 MB to 300 MB of data. The voter's unique private key is embedded in this number, which is stored on the CD. As part of the authentication process at the time of voting, the election headquarters server asks the local executable program from the CD-ROM on the voter's computer to check and return a specific few bytes out of the random number that is stored on the CD. The executable code returns these few bytes as part of the cast, returned ballot. The election headquarters server checks the data content of these few bytes against the known "ball and chain " bytes that the election headquarters server embedded into the random number. The voter may be authenticated using the results of a matching comparison. The significance of the large amount of data in the "ball and chain " is that a virus which is programmed to steal the voter's identity and vote for the voter without benefit of the CD will require an unduly large amount of time to accomplish the data transfer under certain conditions. This large transfer time is required because, without knowing where the election headquarters server will prompt the local executable to look for the key, the virus has to steal the entire random number. Where the virus resides on the Internet or another networked computer, the entire random number is not easy to steal. For example, a 100 MB random number would require approximately 13 hours for transmission on a 28.8 Kbps line.

According to another aspect of the invention in its various embodiments, a ballot viewer object, such as ballot viewer object 100, is used to configure a computer system to download executable program instructions, interact with a voter for the casting of votes, and transmit a secure encrypted file during the course of an election. The system and method permit voting through use of network telecommunications to transmit a downloadable ballot viewer object containing an official ballot image, voter authentication information, and executable code for use in casting a ballot. The system and method incorporate steps of downloading the ballot viewer object, authenticating the voter in association with the ballot viewer object, displaying an official ballot image derived from the ballot viewer object, creating a cast vote record by voter interaction with the official ballot image; and transmitting the cast vote record to an election server.

Figure 2:
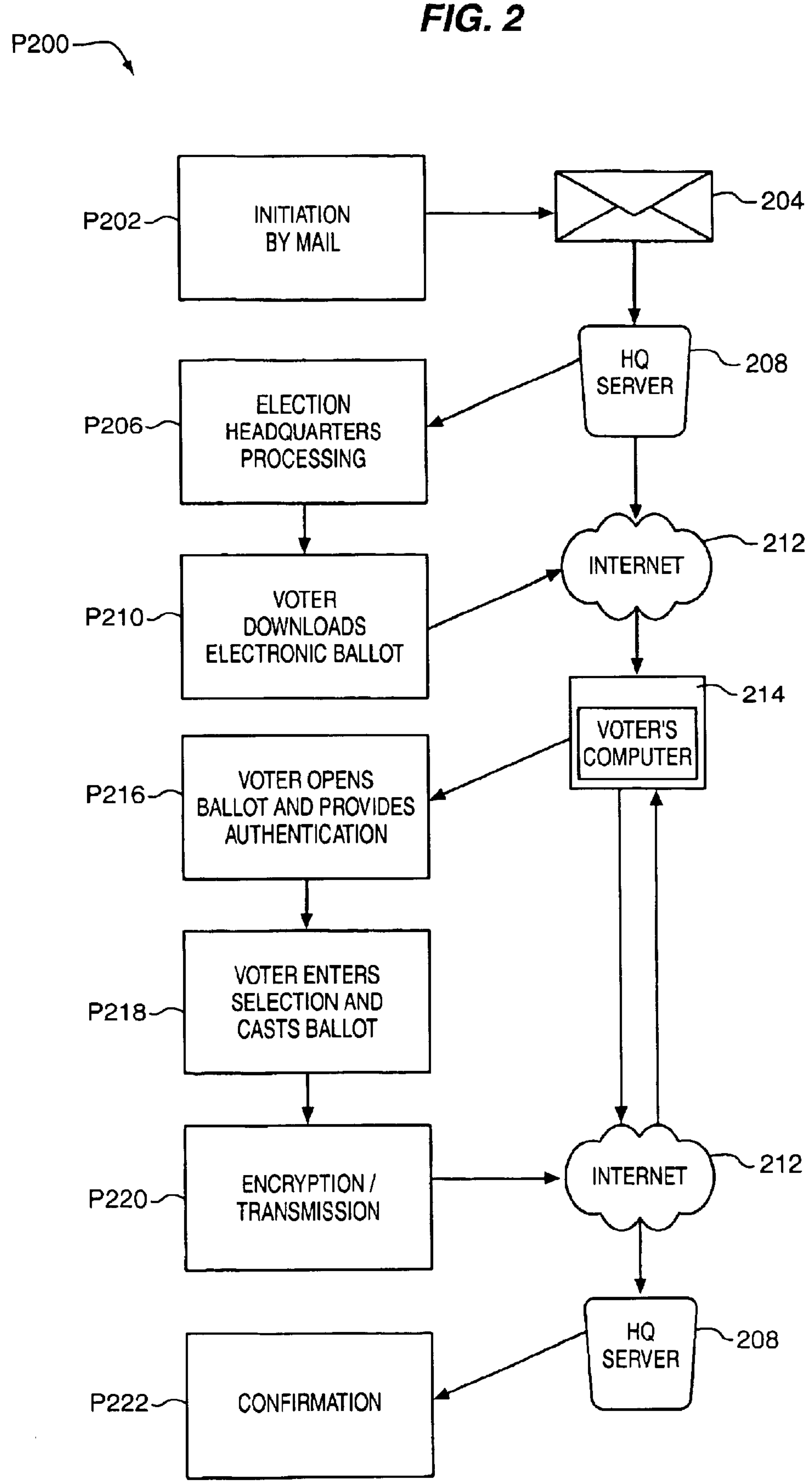
FIG. 2 is a schematic process diagram showing an interaction between a method of operation for the ballot viewer object of FIG. 1 and system apparatus.

FIG. 2 is a process schematic diagram showing an electronic ballot mailing process and system P200. A voter initiates process P200 with a process step P202 including the submission of a document 204 by personal delivery at election headquarters or by regular mail, e.g., through the United States postal service or a private courier agency, such as Federal Express. Document 204 contains voter identification information that can be verified, at least in part, by information in the possession of election headquarters 204, such as a Social Security number, Date of Birth, Zip Code, or a Personal Identification Number (PIN) that issued by the election authority.

Process step P206 commences with the arrival of document 204 at election headquarters 208 or an office that is affiliated with election headquarters, such as a voter registrar's office. Alternatively, as mentioned above, the election headquarters functionality depicted in FIG. 2 may be substituted by interaction with a CD-ROM or another storage medium that is prepared by the election headquarters. Step P206 includes processing the information in document 204 to create an ballot viewer object, such as ballot viewer object 100, or to store the data that is required for the subsequent creation of the ballot viewer object 100.

Step P210 entails the voter downloading the ballot viewer object, e.g., using the Internet 212, or alternative telecommunications arrangements such as intranets, local area networks, direct modem connection, or virtual private networks. The ballot viewer object arrives at the voter's computer 214 by virtue of this transfer. The voter opens the ballot viewer object and undergoes authentication in process step P216, which preferably includes a comparison of voter responses to verify the authentication information that the headquarters server 208 has transmitted with the ballot viewer object 100, but may also include interactive verification of information that is compared with information stored only on the election server 208. The authentication information that is transmitted may be encrypted with the voter's public key, so that it may be decrypted using the voter's private key stored on a smart card or other medium, or hashes of the authentication information may be sent instead of the authentication information itself.

After authentication, process step P218 includes voter interaction with the ballot viewer object 100 to enter selections and cast the ballot. Once the ballot is cast, encryption/transmission of the ballot image occurs in process step P220, and the ballot image or data is transmitted through the Internet 212 for return to the headquarters server 208 of the completed ballot image. The headquarters server 208, or another server for this purpose, processes the ballot image, processes the votes for election vote tallying or accumulation purposes (e.g., by performing an actual tally or preparing the information for tallying by another computer) and, optionally but preferably in step P222, sends a message in the form of an email to the voter's computer confirming that the ballot was cast and entered in the election. The confirmation message may be encrypted with the Election Server's private key (digitally signed) such that the voter may be assured it has been sent from the official election headquarters. The confirmation optionally includes a record of the votes that the voter cast in the election.

Figure 3:
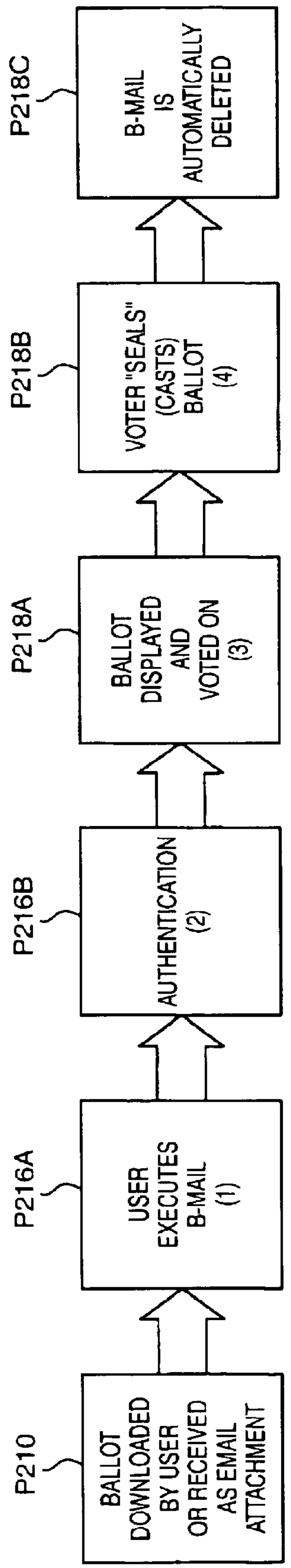
FIG. 3 is a schematic process diagram providing additional detail with respect to FIG. 2.

FIG. 3 provides additional detail with respect to preferred features of process steps P210–P218 of FIG. 2. The process steps shown in FIG. 3 mimic, in an electronic sense, the process of voting by conventional absentee ballot using a paper ballot that is transmitted by regular mail. The voter downloads (receives) the ballot in step P210. The voter opens the ballot in step P216*a*, e.g., by double-clicking an icon in a standard Windows operating system. The ballot itself authenticates the voter in step P216*b*, e.g., by comparing voter identification data entered by the voter against hashed or encrypted data stored with the ballot viewer object. Optionally, the ballot viewer object could authenticate by reading hardware control numbers in a smart card, floppy disk, or CD-ROM that is in the possession of the voter. In contrast, a paper ballot cannot be self-authenticating, so the practice of this embodiment in its preferred aspects provides additional security that cannot be found in paper absentee ballot voting methodologies as they are currently implemented. The ballot is displayed and voted on in step P218*a* where the interactive ballot image appears as would a standard paper ballot. The voter seals the ballot in step P218*b*, and the ballot image, which is hereby defined as any data representation of the ballot, is encrypted, digitally signed and transmitted back to the election headquarters server 208 in step P218*b*. Alternatively, the ballot viewer object 100 may simply make the encrypted ballot image available for use as an email attachment, which the voter affirmatively sends to the election headquarters. The ballot viewer object, e.g., ballot viewer object 100, automatically deletes itself in step P218*c*.

Figure 4:
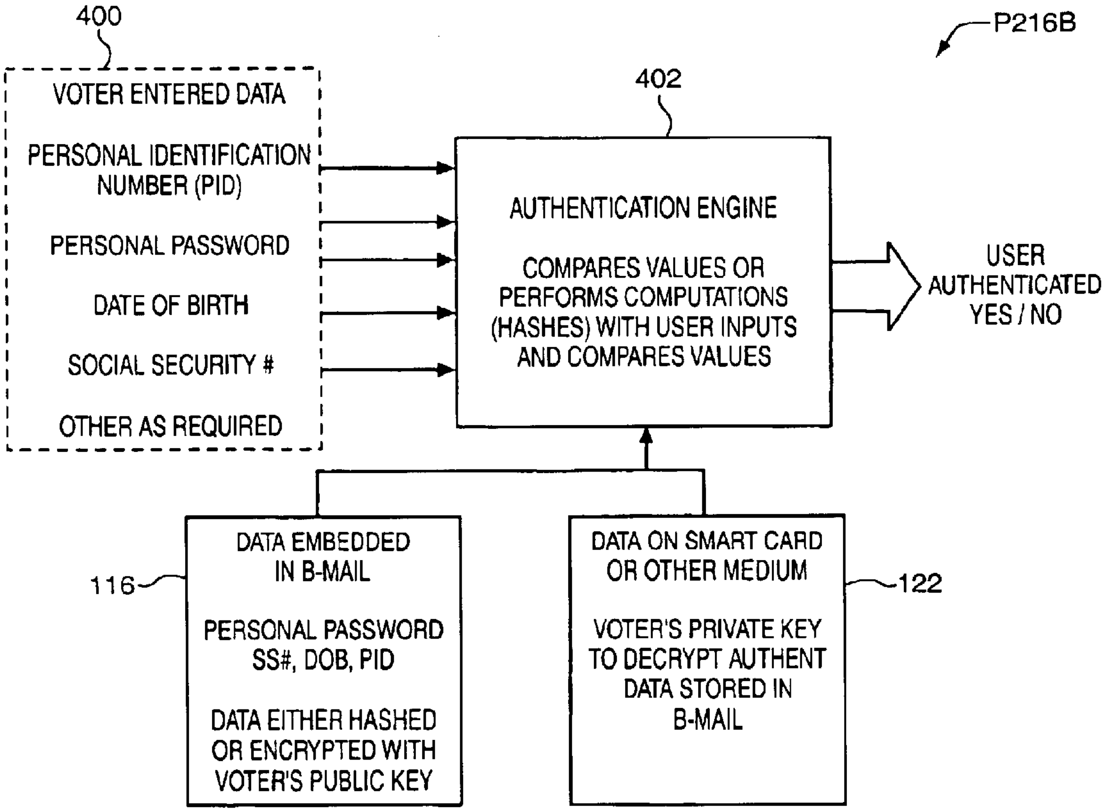
FIG. 4 is a schematic block diagram showing additional detail with respect to voter authentication in a preferred embodiment of the ballot viewer object shown in FIG. 1.

FIG. 4 provides additional detail with respect to a form of ballot viewer object 100 for use in performing the authentication step P216*b*. The executable code 102 of ballot viewer object 100 prompts the voter to enter voter identification data 400. The election headquarters has delivered to the voter a personal identification number (PIN) through regular postal mail or by hand delivery upon personal appearance of the voter. Alternatively, a voter PIN does not have to be sent if the voter possesses a private key, such as data on a smart card or other medium, or an image on a biometric identification device, such as a voice analyzer, fingerprint analyzer or retinal analyzer. In this case, the election authority normally approves the procedures that are used by the certifying authority that is responsible for authenticating the keyholder. Possession of the PIN or key provides substantial assurances that the individual who provides this information is the intended voter. The voter preferably also sends a personal password to the election headquarters. This password is an optional extension that is available to the jurisdictions for authentication purposes. Other authentication data can be required including any information about a voter that is available to the jurisdiction running the election, but such data should not be easy for others to locate. This data includes such information as voter's address, mother's maiden name, children's birthdays, etc.

The hashed VID data 116 or other forms of protected identification data are preferably embedded in the ballot viewer object 100 and are not stored in clear text that could be read by a computer program or by a sophisticated computer developer or intruder. One option is to provide only a secure hash of data. An authentication engine 402 then hashes the user's inputs by an identical hashing algorithm and the hash values of the user's inputs are compared to the stored values. Another option is available when a voter has a smart card reader, floppy or CD, such as may be supplied to the voter with a corresponding smart-card 122, floppy or CD including the voter's private key. The authentication data that is provided in ballot viewer object 100 is encrypted using the voter's public key, and then decrypted in the authentication module using the voter's private key, e.g., by a commercially available encryption program such as Pretty Good Privacy (PGP). In addition, the authentication data in ballot viewer object 100 is optionally and preferably encrypted using the election authorities'private key. The authentication engine decrypts the authentication data using the election headquarters'public key.

Figure 5:
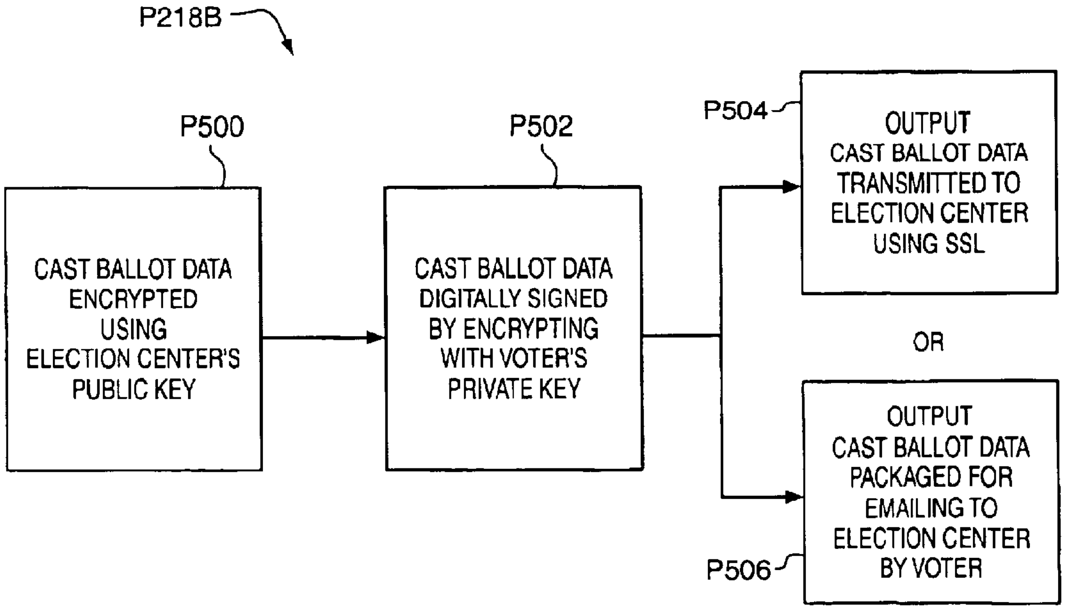
FIG. 5 is a schematic process diagram providing additional detail with respect to casting ballots in a preferred embodiment of the process shown in FIG. 2.

FIG. 5 provides additional detail with respect to a preferred procedure for use in sealing or casting the ballot, e.g., as by step P218*b* of FIG. 3. Certain forms of well-known encryption technology, such as PKI or PGP, use a key that is accessed by an algorithm to process the message being encrypted or decrypted according to complex algorithms. Thus, even though a public key may be known, it remains difficult or impossible to use this key for the purpose of decrypting an encrypted massage. Therefore, the cast ballot image is preferably encrypted in process step P500 using key encryption technology. The ballot image may be further encrypted or alternatively encrypted in step P502 using the voter's private key, but only if the voter has knowledge or possession of his or her private key, e.g., from memory or as encoded in a smart card. The encrypted ballot image may be automatically transmitted to the election headquarters using a very secure SSL link in process step P504 or, alternatively, the encrypted ballot may be packaged in step P506 as an email attachment for transmission to the election headquarters. In addition to packaging the cast ballot data as an encrypted message, it is contemplated that the voter's authentication data is to be also packaged for transmission. This packaging would provide some of the same identification of the sender that digital signing would provide, but not as stringently. This might be helpful in cases where the voter does not have a smart card or other means of storing a private key. It is important to note is that the voter can not alter any votes or vote again once the ballot has been sealed or encrypted, which creates a situation that is ide4ntical to the situation that exists when a voter manually places a paper ballot in a ballot box.

In yet another aspect of the invention according to its various embodiments, the previously described instrumentalities may be implemented as improvements to existing postal service email servers. In an official postal server authorized by a national government agency for the transmission of electronic data, the improvements comprise an interface for batch control processing of electronic ballot information as directed by an election server.

The United States Postal Service (USPS) has developed through interaction with the private sector a secure electronic document transfer service named POSTeCS$^2$, which may optionally be used to secure the communications channels from election headquarters to the voter and return. The POSTeCS system operates as an electronic mail delivery service and can be used to transfer the ballot to the voter and return the voter's cast ballot to the election. For example, the voter may receive an email that contains a unique URL that is associated with a downloadable form of ballot viewer object 100. The server containing the URL is preferably configured to only transmit the data if a proper SSL link is established between server and the voter's computer. Thus, whenever the user clicks the unique URL link, an SSL session will be established to secure the transmission of the ballot viewer object 100.

In more general terms, the POSTeCS service allows a vendor to send an email message to a customer. The message points the customer to an electronic download. The customer's actions of receiving the email, opening the email, and downloading the file are tracked by the USPS, which provides information on the status of the transfer to the customer. The download information is encrypted and transmitted securely, for example using SSL, and the downloads are encrypted while they reside on the USPS server. Before the customer is allowed to download the file, the customer may be asked to enter a password. The USPS charges a transactional fee similar to postage for this service.

Using the USPS POSTeCS system, the download may also be electronically signed by the customer, or encrypted by the customer. In addition, the USPS may encrypt the download so that it can only be decrypted on the user's computer via the user's private key. Electronically signing the document or encrypting the download requires that the user have

[2] Post is a Trademark of the United States Postal Service. a digital certificate in the form of a public/private key pair. In addition, the downloadable program may only be accessible during a certain time window that is defined by the vendor.

Involvement of the USPS in transmitting messages, such as ballot viewer object 100, has important advantages, specifically legal ones. The laws protecting mail fraud cover POSTeCS communications. Thus, stiff criminal and civil penalties regarding theft and alteration of postal mail help reduce potential voter fraud using paper absentee ballots, as well as electronic ballots in the form of ballot viewer object 100. These penalties give a high degree of comfort to government officials who are concerned with voter fraud in Internet voting systems.

Figure 6:
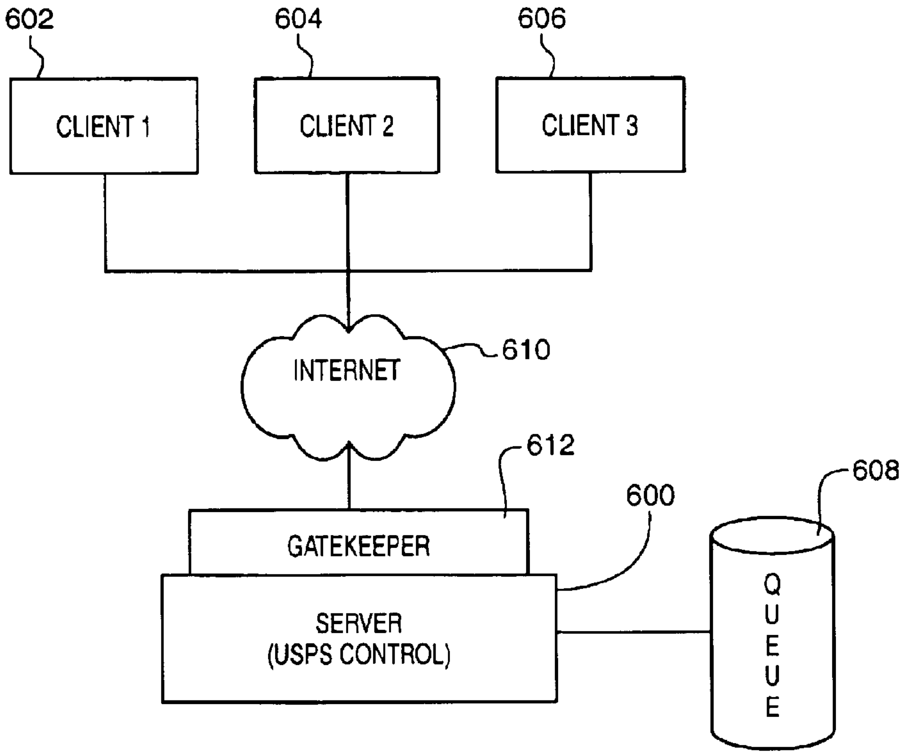
FIG. 6 is a block schematic diagram showing general system components of a secure data transmission system and service that is commercially available from the United States Postal Service (USPS) and subject to modification for the implementation of a preferred embodiment according to an aspect of the invention.

FIG. 6 depicts a general overview of the major operational components relating to the POSTeCS server 600. These components are subject to modification, as described below, to improve operability of the POSTeCS server 600 for purposes of the preferred embodiments of the invention. Any other server or system having similar functionality may replace the POSTeCS server 600. By analogy, the POSTeCS server 600 functions as a normal email server, however, various functions have been added to permit the USPS to charge a transactional fee in transmitting secure email. The POSTeCS server acts as a postman would in carrying and delivering a letter for a fee. p The POSTeCS server 600 resides on a server (or servers) 602, which functions as an electronic mail server in support of a plurality of clients, e.g., clients 602, 604, and 606, who wish to send and receive messages. A queuing agent 608, e.g. a conventional message database, may be used to temporarily store message data. Standard messaging protocols are used to transmit and receive messages through the Internet 610 among the respective clients 602–606. Secure transmission protocols, such as SSL, are normally utilized to preserve the confidentiality and integrity of information in transit. Altogether, these components, as described thus far, may be offered by any email service provider. The POSTeCS server 600 differs from other servers because it is under the control of the United States Postal Service and, consequently, postal service laws and regulations attach to the transmission of information through the server 600. Furthermore, the server 612 is provided with a gatekeeper functionality 612 that is capable of charging transactional fees for the transmission of information. These fees are charged to authorized accounts. The server 600 could be used for purposes of the present invention according to its various embodiments in unmodified form, however, the account authorization processes that are presently required are, in practice, so cumbersome and unwieldy that they are not practicable for use in a large-scale election.

At present, the POSTeCS sever requires a sender to post a message on the queuing agent, the POSTeCS server 600 notifies the intended recipient via email that the message exists for download under specified conditions and times, and the recipient connects to the POSTeCS server 600 to download the message. The sender is charged a transactional fee. Thus, with the present POSTeCS product on the POSTeCS server 600, once a voter has cast a ballot, the voter would have to go through a very cumbersome process to register with POSTeCS as a data sender, and then pay to send the cast ballot record to the election headquarters server 208. The election headquarters would then have to download the posted cast ballot record.

The existing POSTeCS system may be modified to implement the concept of replicating electronically the "self-addressed stamped envelope, " which would permit the voter to act as a customer in voting by absentee ballot with a transactional fee through simplified batch processes excluding the cumbersome registration and downloading processes. Charges may, for example, be prepaid by the voter at the time of voter registration or directed to a charge card that the voter authorizes for use at the time of registering to vote.

Figure 7:
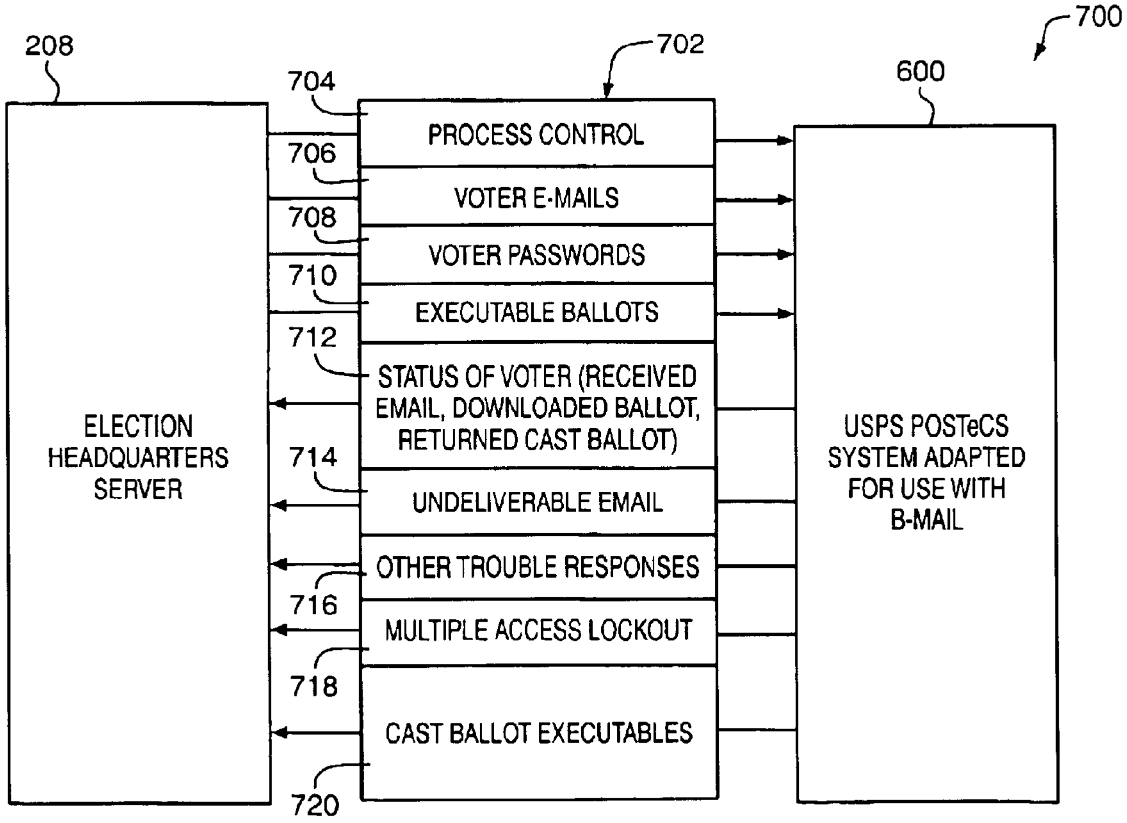
FIG. 7 is a block diagram showing an interface between an election server and the system that is shown in FIG. 6.

FIG. 7 depicts a voter interface 700 constituting, by way of example, a modification to the existing POSTeCS system, which may be implemented as a new type of client 602 or a modification to an existing one of the clients. FIG. 7 describes functional interaction between the headquarters election server and the POSTeCS server 600. In this embodiment, POSTeCS server 600 is used as a pipeline or conduit in sending and receiving ballot mail messages, such as ballot viewer object 100. The interface 700 is optionally and preferably created to perform the operations of functional stack 702 in an automated manner that does not require human intervention, except as described below.

A process control function 704 resides on the headquarters server 208 such that the election headquarters server 208 operates as a vendor on the POSTeCS server 600. Thus, the election headquarters server 208 has the power to initiate transactions in the form of transmitting electronic ballots, such as ballot viewer object 100 by way of example, and to direct charges as appropriate. For example, charges may be made to a governmental agency and/or to the voter's account along preauthorized lines. In other instances, the election headquarters may receive revenue in the form of a service fee that is charged to a governmental agency or to the voter or both. The process control also preferably includes authentication of the election headquarters server, which may require manual data input, such as a password or encryption key. The process control function 704 also includes periodic polling of the POSTeCS server 600 for transmission of return messages from POSTeCS server 600. The executable code 102 of ballot viewer object 100 may be programmed with an identifier, such as a randomly assigned URL, which causes POSTeCS server 600 to receive return messages from the voter and ballot viewer object 100 as though they originate from the election headquarters vendor for fee information purposes in instances where fees are applicable.

Once the process control function 704 authorizes the connection with the election headquarters server 208, function 706 entails the transmission of voter emails, which may be coupled with an electronic ballot such as ballot viewer object 100. These emails are preferably but optionally transmitted as a batch job that originates from pre-transmission services at election headquarters. Function 708 is a preferred but optional function comprising the transmission of voter passwords, such that a voter receiving the email in the form of ballot viewer object 100 can provide the POSTeCS server 600 with a password that may optionally be required to download ballot viewer object 100 from the POSTeCS server 600. The password may be obtained from the voter at the time the voter registers for electronic voting, the password may be created at the election headquarters and mailed to the voter, or the password may be emailed to the voter using key encryption.

Function 710 includes the creation of executable ballots, such as ballot viewer object 100, which may be combined as attachments with the voter emails that are generated by function 706 or stored in a queue, e.g., database 616 (see FIG. 6), for eventual downloading by the voter. In this latter case, the voter may pay a fee for the download and the initial email that is generated by function 706 may be transmitted free of charge to the voter.

Function 712 includes the receipt of tracking information at the election headquarters server 208 from the POSTeCS server 600. As previously indicated, the POSTeCS server 600 tracks the status of messages that have been sent to a customer who in this case is the voter, and POSTeCS server 600 periodically submits this tracking information to the election headquarters server 208. The tracking information includes a status report Silo as to whether the voter has received the email that was generated by function 706, whether the voter has downloaded the executable ballot that was generated by function 710, and whether the voter has returned a cast ballot. Thus, the election headquarters server 208 is able to ascertain whether the voter has voted and permits each voter to vote only one time by verifying whether a particular voter has voted in the election.

A variety of problems may arise in the transmission of the voter emails from function 706, and the election headquarters server 208 is configured to take appropriate action when these troubles arise. For example, when POSTeCS server 600 returns an email as undeliverable, function 714 produces a report identifying the voter. This report may be accessed for manual verification that the email was sent to the intended address. If the address was entered into the election server 208 incorrectly, then manual intervention may be used to correct the address and the email may be sent to the correct address through function 706. If the address is verified as being the one that the voter intended, a telephone call may be placed to resolve the issue or the election headquarters server may generate a letter for delivery to the voter by regular mail requesting the voter to provide a usable address. Function 716 provides responses to other troubles that may arise, such as responses to user inquiries where a voter has difficulty in executing the code 102 on a particular machine or operating system, and may comprise in interactive online help system or access to a help hotline. Another trouble that may arise includes the receipt of corrupted data by the voter or the election headquarters. In this case, function 716 provides for the diagnosis of corrupted data and implements appropriate resolution procedures, such as sending a email to a voter through function 706 requesting the voter to download another ballot viewer object 100 for purposes of re-voting.

A multiple access lockout functionality 718 uses the tracking information that is generated by the status report function 712 to assure that each voter is only permitted to cast one ballot. For example, an identifier that is unique to each voter may be activated when the voter downloads an executable ballot that is generated by function 710. This identifier is then deactivated when the voter returns a cast ballot. Either the election headquarters server 208 or the POSTeCS server 600 may be configured to automatically delete messages from voters having inactivated identifiers. Similarly, the election headquarters server 208 or the POSTeCS server 600 may be configured to delete messages originating from voters who have not downloaded the executable ballots that were generated by function 710. This deletion of unauthorized messages mitigates or eliminates at least one form of denial of service attack by persons who wish to overload the systems by transmitting numerous unauthorized messages to the election headquarters. In case an attack of this nature is attempted, the function 718 may optionally, as opposed to deleting the messages outright, store the messages on a firewall server and parse the messages to obtain information regarding the sender and the transmission pathway for use in investigation by police agencies.

Function 720 entails the receipt of cast ballot executables, such as cast ballot image data that is received from ballot viewer object 100. The election headquarters server 208 automatically scans this data to assure that it is not corrupted, in which case function 716 is invoked. Where the scan validates the data, the votes are processed tallied for inclusion in election totals according to conventional electronic vote accumulation and storage techniques, which may be performed on the election headquarters server 218 or other computers. Prior to tallying votes, voter identification information is separated from the ballot data including the votes. This separation is performed to protect voter anonymity. While a separation of this type may occur at any time during the process, it is preferred to perform the separation when the cast ballot executable is received because this feature permits notification to the voter in case the ballot data is corrupted and it permits the election server 208 to notify the voter that the cast ballot has been received and processed.

With the exception of voter status and trouble responses, the bulk of the sensitive data is preferably transferred via very secure channels. The executable packages in the form of ballot viewer object 100, voter emails and passwords can all be received in batch, perhaps on a CD delivered by a secure carrier, which is hand-carried from the election headquarters to the POSTeCS server 600. Similarly, the receiving of cast ballots by election headquarters could also be via a very secure channel, by manual delivery of physical data (e.g., on optical disk such as a CD, flash memory, or magnetic data storage), or via a dedicated telephone line.

Figure 8:
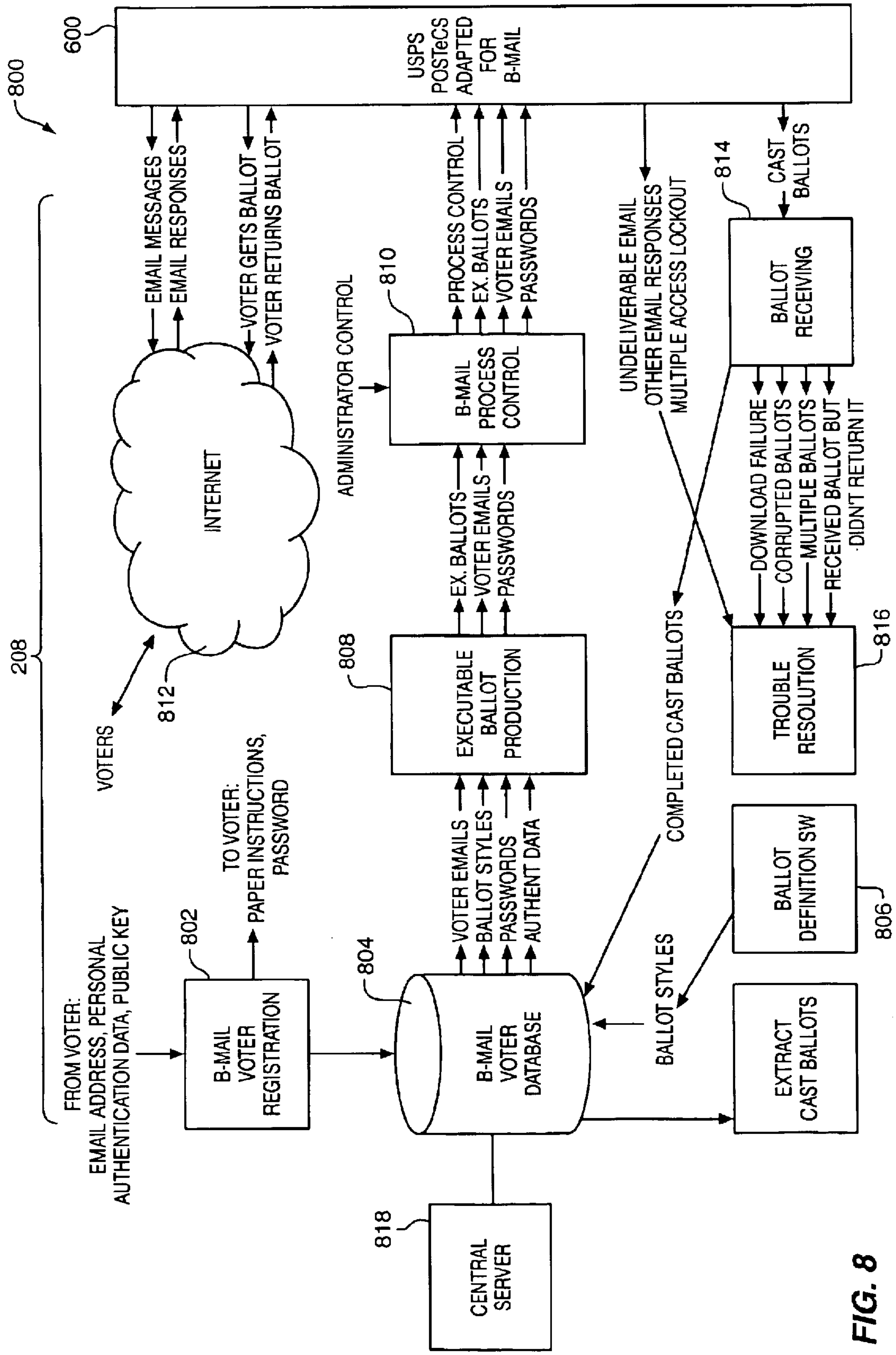
FIG. 8 is a block diagram providing additional detail with respect to a systematic implementation of the interface shown in FIG. 6.

FIG. 8 is a block schematic diagram depicting, by way of example, a system implementation in greater detail than that which is shown in FIG. 7. The system 800 may be configured to reside on a single server, which operates as both the election headquarters server 208 and the POSTeCS server 600, or the functions may be divided among a plurality of different servers. The functions are performed by software and hardware that reside on the various servers according to respective implementations.

A registration block 802 permits the voter to register for electronic voting through use of an electronic ballot, such as ballot viewer object 100, which may be transmitted through the use of email. As used herein, the term "B-Mail " is used to identify the use of executable packages in the nature of ballot viewer object 100 and includes packages that are transmitted through the use of email, as well as packages that are transmitted by other electronic means. The voter registration process for B-Mail is similar to that used for paper absentee ballots, or for mail voting in general. Once authenticated by an election official, the voter will provide an email address, further voter authentication information (mother's maiden name, town of birth, SS#, etc.) and, optionally, a digital certificate including a pubic and private key for encryption purposes. The last two items may or may not be supported or required by a particular governmental agency for use in voting. The election headquarters server 208 then generates a paper confirmation including a voter password for opening the executable code 102 of ballot viewer object 100. If the voter does not have an email address, the election headquarters server may provide the voter with written instructions for downloading ballot viewer object 100 directly from the Internet.

Upon registration, the election headquarters server 208, optionally but preferably, notifies the voter by generating a paper letter showing the primary password that the voter uses to download an executable ballot. This paper is mailed to the voter by manual means, hand delivered upon personal appearance of the voter, or email can be used particularly where the password can be protected by encryption. If the voter does not have an email address, the election headquarters server 208 generates a voter-specific uniform resource locator (URL) for the voter's downloadable ballot, and this URL may be given directly to the voter on paper. The voter can then vote using any Internet-connected computer and need not have an email address. If the voter has an extant digital certificate (public/private key pair) for PKI encryption purposes, the voter will have to so indicate and supply the public key to the registration officials. Alternatively, a governmental agency, the election headquarters server, or the USPS provides these digital certificates to the voter.

A secure database 804 includes all voter identification information, passwords generated by the voter registration system, other voter authentication information, and a table that records the voter's voting status, e.g., as having registered, been provided with an electronic ballot for download, downloaded an electronic ballot, cast a ballot, or having transmitted corrupted ballot data.

The executable code 102 of ballot viewer object 100 includes a ballot viewer segment that replicates electronic ballot information according to the voter's residence and eligibility to participate in specific elections. These various ballot styles may be generated on commercial order, for example, by contacting Hart Intercivic of Austin, Tex., which specializes in producing multiple ballots for use in a single jurisdiction and has developed proprietary software for purposes of generating these ballots. Thus, data or executable code corresponding to plurality of ballot styles resides or is accessed by the database 804. Once the voter has cast a valid ballot, the valid cast-vote record including all votes cast will also preferably reside on the database 804, but with no relation to the voter. The valid ballot is optionally but preferably encrypted in such a way as to be unreadable from the database without encryption key information.

An executable ballot production block 808 is a reporting function that accesses the information from database 804 to generate ballot viewer object 100, which optionally but preferably contains a particular ballot style corresponding to the voter's eligibility for voting in a predetermined list of elections. Ballot viewer object 100 also contains hashed VID data as discussed above, password authentication, and other authentication data as deemed appropriate by the election authority. Thus, the ballot production block 808 produces a unique serialized executable program that the user can use to cast his or her ballot The ballot production block 808 also provides an email message notifying the voter that the ballot viewer object 100 has been made-ready for download and also informs the voter of the dates during which a download may occur.

A process control block 810 receives input from the election authority or election administrator and controls the election. The administrator input sets start and stop dates, as well as voting times for the election are set. Various optional settings are made through this component, as required for the conduct of an election pursuant to election statutes and regulations. The process control block 810 communicates directly with the USPS POSTeCS server 600 by sending process control information along with executable ballots and voter emails and passwords. The ballots, emails and passwords may be sent in bulk to the USPS system via a very secure channel or even hand-carried, as discussed above. In turn, the POSTeCS server 600 transmits the email messages to the respective voters using the Internet 812 and conventional transmission protocols.

The voter opens the URL that was sent to him via email from the POSTeCS server 600. This URL opens to a password access screen that is provided as part of the client interface. If the user enters the correct password, an interface is displayed that shows the ballot viewer object 100 for download. Optionally, more than one ballot viewer object 100 can be provided for download, as the user may be using a PC, a Mac or other supported machine running a different operating system. In preferred embodiments, the downloading function enforces a virus checking procedure to assure that the voter's machine is clean and free of viruses. The user downloads the correct version of ballot viewer object 100 for his or her operating system. The POSTeCS services of POSTeCS server 600 that are preferably used in combination with the downloading process include downloading a Java Applet onto the voter's computer prior to download, and certifying that the download is protected by SSL communication encryption.

The voter then executes the downloaded ballot viewer object 100. An authentication screen is shown, asking the user for specific personal information. Depending on the implementation, the voter may be denied access at that time if incorrect data is entered, or the determination of authenticity may be done after voting, by software on the election headquarters server 208. Once the user has completed entering the correct authentication information, the voter is presented with an electronic ballot. The voter makes all of his or her selections, and casts the ballot, as prompted by interaction with ballot viewer object 100.

Once the ballot is sealed, ballot viewer object 100 processes the completed ballot or cast-vote record for return to the POSTeCS server 600 through the Internet 600. As required, the voter may receive notification that the ballot has been received and properly entered at election headquarters.

The election headquarters server receives the cast vote record information from the POSTeCS server 600 and processes the same through use of a ballot-receiving block 814, which certifies the cast vote record as being 'valid' prior to applying the cast votes to election tallies. A valid ballot in this context means a ballot that is not damaged or corrupted, and where the voter has correctly authenticated him/herself. In addition, as previously mentioned, the ballot-receiving block 814 module detects and resolves the problems of multiple ballots being returned, as well as other problems. The valid cast vote record information is delivered to the database 804 for eventual extraction and tabulation.

The ballot receiving block 814 forwards to the trouble resolution block 816 a variety of action matters, as described above, including download failure, corrupted ballots, and multiple cast ballots. Additionally, the trouble resolution block 816 is capable of acting upon multiple categories of feedback from the POSTeCS server 600, such as notices showing the voter's email was undeliverable, or that a failure occurred when the voter was downloading the ballot viewer object 100. The trouble resolution block responds appropriately to these matters, as needed, and acts in compliance with local laws, regulations, and practices concerning these issues by analogy to absentee voting practices.

Upon the close of an election, the valid cast vote records are stored in the database 804. These ballots are preferably stored in an encrypted format using a public key that may be accessed by the election headquarters server 208 or a separate server 818. In cases where a separate server 818 is used, this server is preferably a central server that may, for example, tally the election results from a plurality of precincts where the election headquarters server 208 resides at the precinct level. Alternatively, the cast vote records may be processed by the election headquarters server or the separate server 818, stored on any storage medium, and hand-carried to another computer that tallies or accumulates the votes in an election. The election headquarters server 208 may also provide this central function of accumulating the cast vote records. Server 818 or 208 gathers the cast vote records, decrypts them, and extracts the data for conversion into a conventional format for tabulation of electronic votes.

It will be appreciated that the foregoing discussion is directed towards the preferred embodiments, and the method and apparatus may be modified to accomplish the same or substantially the same results. For example, the authentication of voter information need not precede the selection of votes, and authentication can occur at any level of process P200. Similarly, even though certain functions, such as the casting of ballots in step P216, are depicted as occurring on the voter's computer, the engine for execution of ballot viewer object 100 can reside on any CPU in a distributed processing environment. Any form of encryption may be used and, although encryption is not absolutely required, it much preferred to assure the integrity of large elections.

Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. An encrypted computer readable form embodying machine executable instructions for permitting a voter to cast a ballot by interaction with an official ballot image resulting in the creation of a cast vote record that maybe transmitted to a server, comprising:

a computer-readable medium encoded with a computer program instructions operable to convert the computer readable form from an encrypted to a decrypted state such that in the decrypted state the computer readable form includes voter authentication code for comparing official voter authentication data against data to be provided by the voter at the voter's personal computer;

display code configured for use in displaying the official ballot image to the voter while permitting the voter to create a cast vote record by interaction with the ballot image until such time as the voter casts the ballot; and message transmission code for use in transmitting the cast vote record to the server, wherein the voter authentication code is configured to authenticate a voter for voting on a personal computer without requiring a server to assist in authenticating an individual voter while the display code is present on the personal computer.

2. The encrypted computer readable form of claim 1, wherein the voter authentication data is selected from the group consisting of a password, biometric data, mother's maiden name, town of birth, social security number, children's birthdays, voter address, and other personal data.

3. The encrypted computer readable form of claim 1, wherein the voter authentication code includes code for comparing an official password against a password that is provided by the voter.

4. The encrypted computer readable form of claim 1, wherein the voter authentication code includes code for accessing a biometric authentication device.

5. The encrypted computer readable form of claim 1, wherein the voter authentication code includes code for accessing a device in the possession of the voter, the device being selected from the group consisting of a smart card, an optical storage device, and a magnetic storage device.

6. The encrypted computer readable for of claim 1, wherein the voter authentication code includes code for comparing hashed authentication data against voter input data.

7. The encrypted computer readable form of claim 1 including data for the official ballot image presenting the voter with all choices as they would appear on an absentee paper ballot that the voter would receive in an election.

8. The encrypted computer readable form of claim 1 including data comprising the official ballot image which is accessible to the display code to present the voter with a ballot consisting of contests in which the voter is authorized to vote.

9. The encrypted computer readable form of claim 1 comprising code for checking video memory for ballot selections that are displayed to the voter against other memory containing ballot choices that the voter has made.

10. The encrypted computer readable form of claim 1, wherein the message transmission code includes code for encrypting the cast vote record prior to transmission.

11. The encrypted computer readable form of claim 10, wherein the message transmission includes code for implementing a secure transmission protocol in transmitting the cast vote record to an election server.

12. The encrypted computer readable form of claim 1, wherein the encrypted computer readable form is stored on a disk.

13. The encrypted computer readable form of claim 1, wherein the encrypted computer readable form is configured for download from a server.

14. The encrypted computer readable form of claim 1, wherein the message transmission code includes code for encrypting the cast vote record prior to transmission through use of an encryption key.

15. The encrypted computer readable form of claim 14, including code for deleting the decrypted computer readable form once the code for encrypting and the message transmission code have completed their tasks.

16. The encrypted computer readable form of claim 1, wherein the encrypted computer readable form is packaged as an object including all data that is required for voter authentication.

17. The encrypted computer readable form of claim 1, wherein the encrypted computer readable form is packaged as an object including all data that is required for the voter to create a cast vote record.

18. The encrypted computer readable form of claim 1 including code for implementing a virus mitigation measure.

19. The encrypted computer readable form of claim 18, wherein the virus mitigation measure is selected from the group consisting of compiled sections of executable code with a plurality of static functions in different order, the insertion of junk functions into executable code, an absence of text tags to system function calls, serialized executable file names, serialized data file headers, virus checking upon execution of the decrypted computer readable form for viruses that are known to interact with the decrypted computer readable form, and means for comparing video memory to the ballot image that is displayed to the voter.

20. A method of voting using network telecommunications through use of a downloadable encrypted ballot viewer object containing an official ballot image, voter authentication information, and executable code for use in casting a ballot, the method comprising the steps of:

downloading the encrypted ballot viewer object;

decrypting the ballot viewer object to produce a decrypted ballot viewer object authenticating a voter in association with the decrypted ballot viewer object;

displaying an official ballot image derived from the decrypted ballot viewer object;

creating a cast vote record by voter interaction with the official ballot image; and transmitting the cast vote record to an election server the step of authenticating the voter being performed after the step of decrypting the ballot and before the step of transmitting the cast vote record by executing voter authentication code from the ballot viewer object and authenticating the voter without interacting with the server after the step of downloading the ballot viewer object.

21. The method according to claim 20, wherein the step of downloading the encrypted ballot viewer object includes downloading the encrypted ballot viewer object as an email attachment.

22. The method according to claim 20 including a step of storing the encrypted ballot viewer object on a server that is accessible from the Internet.

23. The method according to claim 22 including a step of notifying a voter that the downloadable encrypted ballot viewer object has been stored on the server and is available for download prior to the downloading step.

24. The method according to claim 20 including a step of charging a transactional fee for at least one of the downloading and transmitting steps.

25. The method according to claim 20, wherein the step of downloading the encrypted ballot viewer object includes downloading the encrypted ballot viewer object through use of an official service of the United States Postal Service.

26. The method according to claim 20, wherein the step of downloading the encrypted ballot viewer object includes downloading through the use of a secure transmission protocol.

27. The method according to claim 20, wherein the step of downloading the encrypted ballot viewer object includes a step of confirming a voter by password prior to commencing the downloading step.

28. The method according to claim 20, wherein the step of downloading the encrypted ballot viewer object includes encrypting the ballot viewer object for download.

29. The method according to claim 20, wherein the step of authenticating the voter includes comparing the voter authentication information with interactive input provided by a voter.

30. The method according to claim 29, wherein the voter authentication information contained in the encrypted ballot viewer object is hashed and the step of authenticating the voter includes hashing the interactive input from the voter for comparison purposes.

31. The method according to claim 20, wherein the step of displaying the official ballot image includes displaying an electronic replica of an absentee paper ballot that a voter would receive in an election.

32. The method according to claim 20 including a step of encrypting the cast vote record prior to the transmitting step.

33. The method according to claim 20 including a step of deleting the decrypted ballot viewer object and cast vote record from a voter's computer once the transmitting step is complete.

34. The method according to claim 20 including a step of sending an email confirmation message to the voter upon receipt of the cast vote record transmitted by the voter.

35. The method according to claim 34 including a step of replicating the voter's cast vote record in the email confirmation message.

36. The method according to claim 20 including a step of creating the encrypted ballot viewer object to have a unique combination of voter authorization information and official ballot image information assigned to a particular voter.

37. The method according to claim 36, wherein the official ballot image information includes selecting contests for presentation in the official ballot image according to contests in which the voter is authorized to vote.

38. The method according to claim 20, wherein the transmitting step is performed using an official server that is authorized by the United States Postal Service.

39. The method according to claim 20, wherein the transmitting step is performed using encryption of the cast vote record.

40. The method according to claim 20, wherein at least one of the downloading and transmitting steps is accomplished through use of the Internet.

41. The method according to claim 40 including a step of resolving problems that arise as a result of transmitting messages through use of the Internet.

42. The method according to claim 41, wherein the step of resolving problems includes parsing the cast vote record to identify corrupted ballot information.

43. The method according to claim 41, wherein the step of resolving problems includes preventing a single voter from casting multiple ballots.

44. The method according to claim 41, wherein the step of resolving problems includes notifying the voter that an encrypted ballot viewer object has been downloaded but the transmitting step has not been completed within a predetermined amount of time since the downloading step occurred.

45. The method according to claim 41, wherein the step of resolving problems includes facilitating a subsequent download in the event of a download failure upon an initial attempt at performing the download step.

46. The method according to claim 20 including a step of protecting against virus attack.

47. The method according to claim 46, wherein the protecting step includes creating the encrypted ballot viewer object by compiling sections of executable code with a plurality of static functions in different order, inserting junk functions into executable code, avoiding use of text tags to system function calls, using serialized executable file names, using serialized data file headers, checking upon execution of the computer readable form for viruses that are known to interact with the computer readable form, and comparing video memory to ballot selections that the voter has made.

48. A system for use in voting through network telecommunications devices that transmit a downloadable encrypted ballot viewer object containing an official ballot image, voter authentication information, and executable code for use in casting a ballot, the system comprising:

means for downloading the encrypted ballot viewer object;

means for decrypting the encrypted ballot viewer object to provide a decrypted ballot viewer object;

means for authenticating a voter in association with the decrypted ballot viewer object;

means for displaying an official ballot image derived from the decrypted ballot viewer object;

means for creating a cast vote record by voter interaction with the official ballot image; and means for transmitting the cast vote record to an election server, the means for authenticating the voter being configured for operation sequentially after execution of the means for downloading the ballot and before execution of the means for transmitting the cast vote record, the means for authenticating the voter including executable authentication code obtained from the decrypted ballot viewer object, the executable voter authentication code not requiring interaction with a server after the downloading the encrypted ballot viewer object to complete voter authentication processing.

49. The system of claim 48, wherein the means for downloading the encrypted ballot viewer object includes means for downloading the encrypted ballot viewer object as an email attachment.

50. The system of claim 48 including means for storing the encrypted ballot viewer object on a server that is accessible from the Internet.

51. The system of claim 50 including means for notifying a voter that the downloadable encrypted ballot viewer object has been stored on the server and is available for download prior to use of the downloading means.

52. The system of claim 48 including means for charging a transactional fee for use of at least one of the downloading and transmitting means.

53. The system of claim 48, wherein the means for downloading the encrypted ballot viewer object includes means for downloading the encrypted ballot viewer object through use of an official service of the United States Postal Service.

54. The system of claim 48, wherein the means for downloading the encrypted ballot viewer object includes means for downloading through the use of a secure transmission protocol.

55. The system of claim 48, wherein the means for downloading the encrypted ballot viewer object includes means for confirming a voter by password prior to use of the downloading means.

56. The system of claim 48, wherein the means for downloading the encrypted ballot viewer object includes means for encrypting a nonencrypted ballot viewer object.

57. The system of claim 48, wherein the means for authenticating the voter includes means for comparing the voter authentication information with interactive input provided by a voter.

58. The system of claim 57, wherein the voter authentication information contained in the encrypted ballot viewer object is hashed and the means for authenticating the voter includes means for hashing the interactive input from the voter for comparison purposes.

59. The system of claim 48, wherein the means for displaying the official ballot image includes means for displaying an electronic replica of an absentee paper ballot that a voter would receive in an election.

60. The system of claim 48 including means for encrypting the cast vote record prior to use of the transmitting means.

61. The system of claim 48 including means for deleting the decrypted ballot viewer object and cast vote record from a voter's computer once the transmitting means has transmitted the cast vote record.

62. The system of claim 48 including a means for sending an email confirmation message to the voter upon receipt of the cast vote record transmitted by the voter.

63. The system of claim 62 including means for replicating the voter's cast vote record in the email confirmation message.

64. The system of claim 48 including means for creating the encrypted ballot viewer object to have a unique combination of voter authorization information and official ballot image information assigned to a particular voter.

65. The method according to claim 64, wherein the official ballot image information includes selected contests for presentation in the official ballot image according to contests in which the voter is authorized to vote.

66. The system of claim 48, wherein the transmitting means includes transmission through an official server that is authorized by the United States Postal Service.

67. The system of claim 48, wherein the transmitting means includes means for encrypting the cast vote record.

68. The system of claim 48, wherein at least one of the downloading and transmitting means includes the Internet.

69. The system of claim 68 including a means for resolving problems that arise as a result of transmitting messages through use of the Internet.

70. The system of claim 69, wherein the means for resolving problems includes means for parsing the cast vote record to identify corrupted ballot information.

71. The system of claim 69, wherein the means for resolving problems includes means for preventing a single voter from casting multiple ballots.

72. The system of claim 69, wherein the means for resolving problems includes means for notifying the voter that an encrypted ballot viewer object has been downloaded but that a transmission from the transmitting means has not been received within a predetermined amount of time since the encrypted ballot viewer object was downloaded.

73. The system of claim 69, wherein the step of resolving problems includes facilitating a subsequent download in the event of a download failure upon an initial attempt at performing the download step.

74. The system of claim 48 including a means for protecting against virus attack.

75. The system of claim 74, wherein the protecting means includes a means selected from the group consisting of means for creating the encrypted ballot viewer object by compiling sections of executable code with a plurality of static functions in different order, means for inserting junk functions into executable code, an absence of text tags to system function calls, means for using serialized executable file names, means for using serialized data file headers, means for checking upon execution of the computer readable form for viruses that are known to interact with the computer readable form, and means for comparing video memory to the ballot image that is displayed to the voter.

* * * * *

UNITED STATES PATENT AND TRADEMARK OFFICE

CERTIFICATE OF CORRECTION

PATENT NO. : 6,873,966 B2 
DATED : March 29, 2005
INVENTOR(S) : Victor L. Babbitt and Neil L. McClure It is certified that error appears in the above-identified patent and that said Letters Patent is hereby corrected as shown below:

<u>Column 2,</u>
Line 37, “Solution” should be centered and read -- SOLUTION --;
Line 58, the words “ballot to as server.” should read -- ballot to a server --.

<u>Column 3,</u>
Line 17, the words “contests resented” should read -- contests presented --.

<u>Column 4,</u>
Lines 34-35, the words “As mentioned above” should begin a new paragraph.

<u>Column 5,</u>
Line 2, “and constitute a part of the specification, illustrate a pres-” should read -- and constitute a part of the specification, illustrate pres- --.

<u>Column 6,</u>
Line 59, the words “and “seal” the ballot” should read -- and “seals” the ballot --.

<u>Column 8,</u>
Line 11, “Windows[1] operating systems may require a stub uninstall” should read -- Microsoft® Windows® operating systems may require a stub uninstall --;
Line 14, delete “[1]Windows is a Trademark of Microsoft Corporation Located Redmond Wash.”.

<u>Column 10,</u>
Line 16, the words “Voter’s can be emailed” should read -- Voters can be emailed --;
Line 34, the words “user s” should read -- user’s --.

<u>Column 12,</u>
Line 22, “The voter opens the” should start a new paragraph.

<u>Column 14,</u>
Line 25, the word “ide4ntical” should read -- identical --;
Line 38, the word “POSTeCS[2]” should read -- POSTeCS® --.

UNITED STATES PATENT AND TRADEMARK OFFICE

CERTIFICATE OF CORRECTION

PATENT NO. : 6,873,966 B2 
DATED : March 29, 2005
INVENTOR(S) : Victor L. Babbitt and Neil L. McClure It is certified that error appears in the above-identified patent and that said Letters Patent is hereby corrected as shown below:

<u>Column 15,</u>
Line 3, “user have” should read -- user have a digital certificate in the form of a public/private key pair. In addition, the downloadable program may only be accessible during a certain time window that is defined by the vendor. --;
Lines 4-7, delete “[2] Post is a Trademark of the United States Postal Service, a digital certificate in the form of a public/private key pair. In addition, the downloadable program may only be accessible during a certain time window that is defined by the vendor.”;
Line 25, the words “email server, however” should read -- email server; however --.

<u>Column 17,</u>
Line 11, “includes a status report Silo as to whether the voter has” should read -- includes a status report as to whether the voter has --.

<u>Column 19,</u>
Line 52, the words “made-ready for” should read -- made ready for --.

<u>Column 21,</u>
Line 24, “much preferred to assure the integrity of large elections.” should read -- is much preferred to assure the integrity of large elections. --.

<u>Column 25,</u>
Line 11, “interaction with a server after the downloading the” should read -- interaction with a server after downloading the --.

Signed and Sealed this

Sixteenth Day of August, 2005

JON W. DUDAS
*Director of the United States Patent and Trademark Office*